Oct. 8, 1940.  E. L. ROSE,  2,216,987
POWER TRANSMISSION
Filed Nov. 17, 1936    3 Sheets-Sheet 1

INVENTOR
EDWIN L. ROSE
BY
Ralph L. Tweedale
ATTORNEY

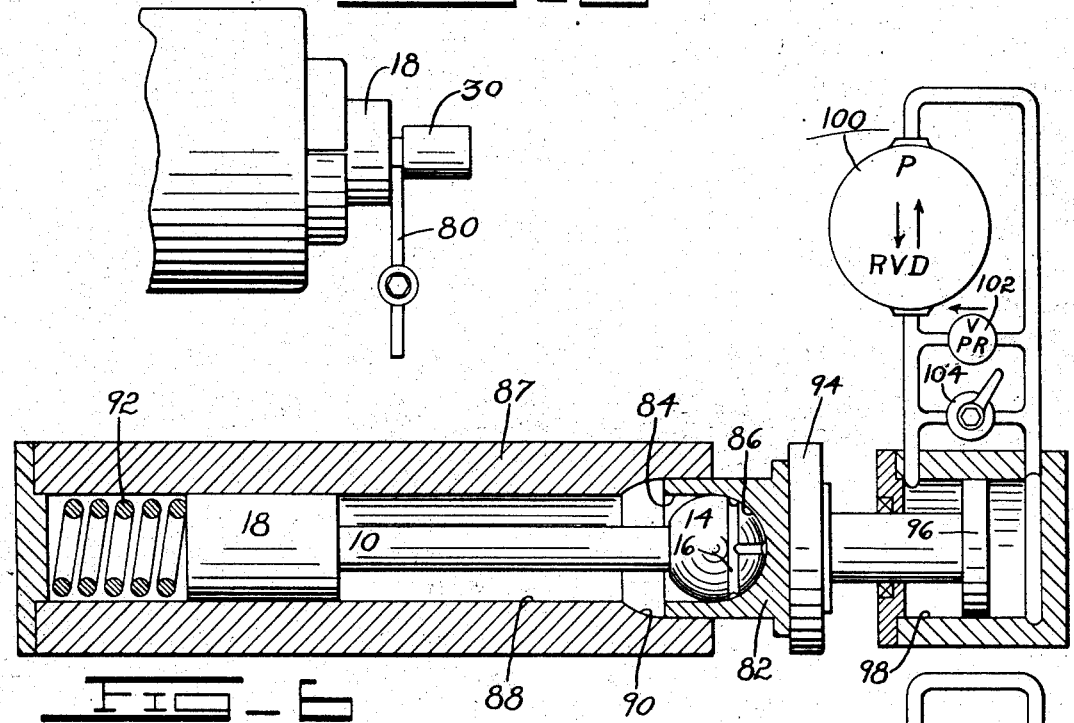
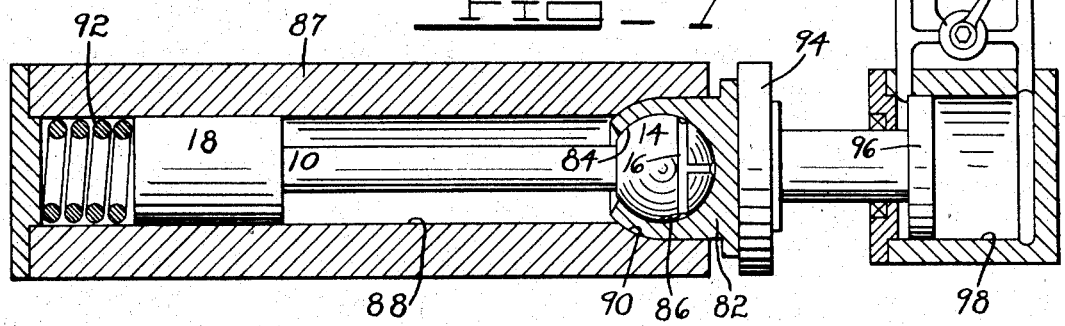

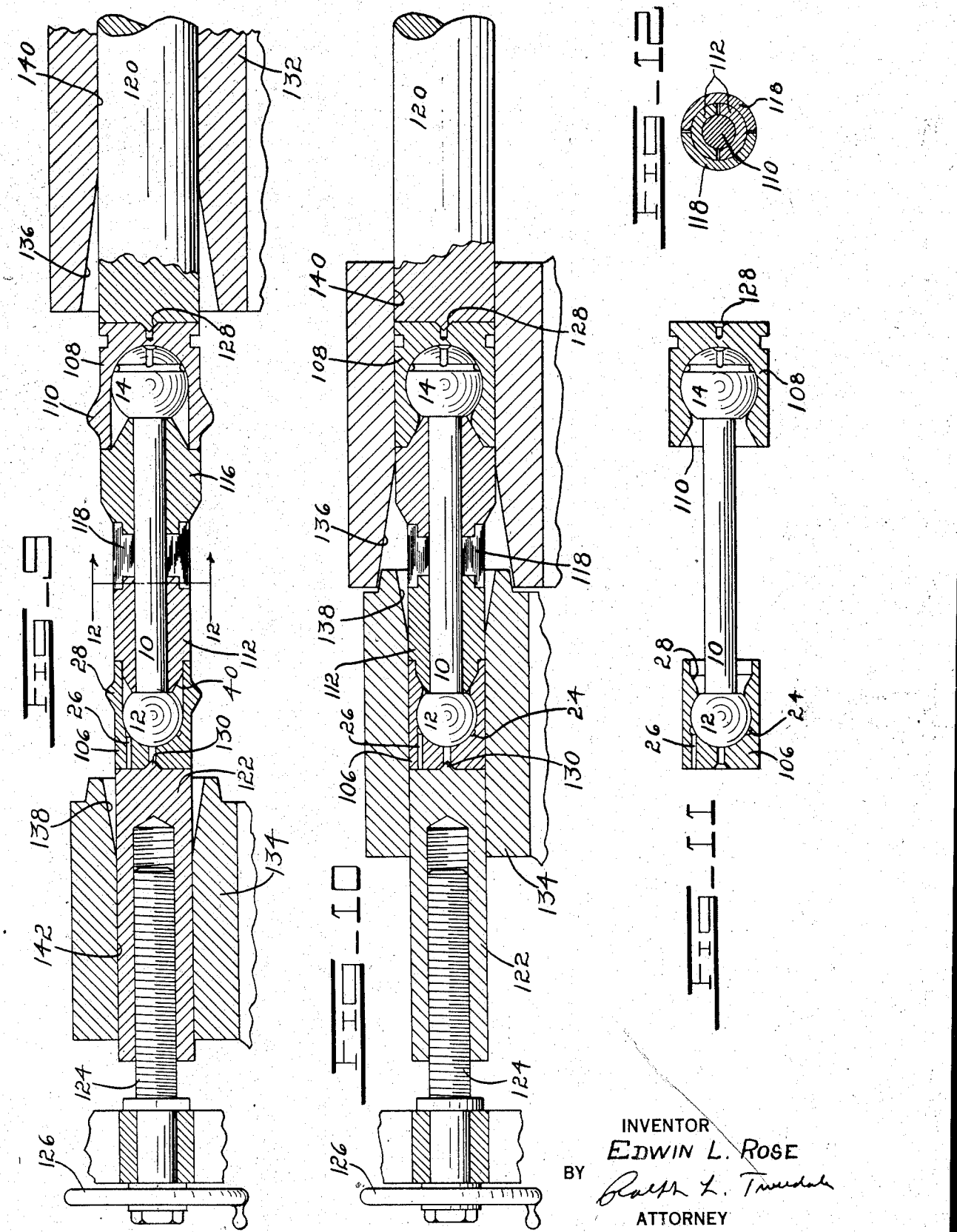

Patented Oct. 8, 1940

2,216,987

UNITED STATES PATENT OFFICE 2,216,987

POWER TRANSMISSION

Edwin L. Rose, Watertown, Conn., assignor to The Waterbury Tool Company, Waterbury, Conn., a corporation of Connecticut Application November 17, 1936, Serial No. 111,241

6 Claims. (Cl. 29—156.4)

This invention relates to power transmissions, particularly to those of the type comprising one or more fluid pressure energy translating devices, one of which may function as a pump and another as a fluid motor. The invention is particularly concerned with a method of manufacturing a sub-assembly for a fluid pressure energy translating device of the rotary barrel and swash plate type, such a sub-assembly including a ball ended connecting rod having a one-piece piston mounted on one ball end and a one-piece socket member mounted on the other ball end.

In devices of this character as heretofore constructed the ball and socket joints at the piston and at the socket ring have usually been formed with a split socket member which is assembled together to embrace the ball by suitable screw fastenings. The operation of fitting such a socket on a given ball is a tedious, "cut and try" process requiring a large amount of skilled hand labor. Inasmuch as a complete power transmission ordinarily utilizes from twenty-eight to thirty-six such ball and socket joints, the labor involved in hand fitting is a substantial part of the cost of the transmission. While it has long been known that it would be desirable to form such ball and socket joints by deforming a one-piece socket member to embrace a ball, heretofore no satisfactory method for doing this has been evolved. Inasmuch as it is absolutely necessary to provide an exact and a uniform clearance between the ball and the socket to provide for film lubrication and to prevent lost motion, previous attempts in this direction have been unsatisfactory since it has been impossible to control such clearance precisely.

It is an object of the present invention to provide a novel method and apparatus for forming a one-piece socket member embracing a ball member over more than a hemisphere, to form a ball joint with uniform clearance and without lost motion when properly lubricated.

A further object is to provide a method of forming a sub-assembly unit comprising a piston, a connecting rod, and a socket member articulated together by integral ball joint constructions.

Further objects and advantages of the present invention will be apparent from the following description, reference being had to the accompanying drawings wherein a preferred form of the present invention is clearly shown.

In the drawings:

Fig. 5 is a view showing a lathe operation performed after the sizing operation of Fig. 3.

Fig. 6 is a diagrammatic cross section of a swaging press showing a piston, connecting rod, and socket member assembled therein prior to swaging.

Fig. 7 is a view corresponding to Fig. 6 after the swaging operation has been completed.

Fig. 8 is a longitudinal sectional view of a completed piston, connecting rod and socket member sub-assembly.

Fig. 9 is a longitudinal cross section of a drawing press for performing a modification of the method of the present invention and illustrating a piston, connecting rod and socket member assembly prior to the drawing operation.

Fig. 10 is a view corresponding to Fig. 9 after the completion of the drawing operation.

Fig. 11 is a longitudinal section of a modified form of a sub-assembly made in accordance with Figs. 9 and 10.

Fig. 12 is a cross section on line 12—12 of Fig. 9.

Figure 1:
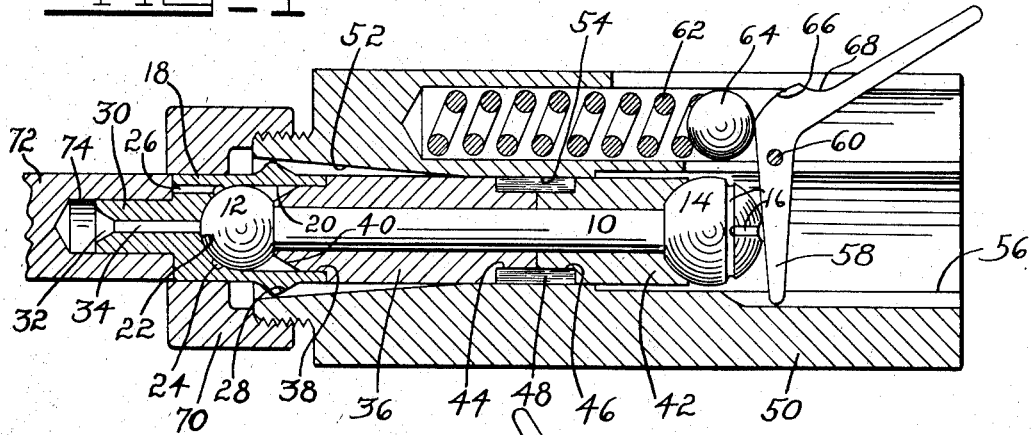
Fig. 1 is a longitudinal cross section of a drawing apparatus showing a piston and connecting rod assembly therein prior to the drawing operation.

According to the form of the invention illustrated in Figs. 1 through 8, a connecting rod 10 is formed having a small ball end 12 and a large ball end 14. The connecting rod may be formed of hardened steel with the ball ends 12 and 14 accurately ground to true spherical shape except for balancing and lubricating grooves 16 formed on the ball 14. A piston member 18 is formed with a cylindrical bore 20 open at one end and terminating at the opposite end in a hemispherical socket 22, a suitable lubricating groove 24 and bore 26 being provided. The outer surface of the piston 18 is formed as a cylinder interrupted by a raised annular band as indicated at 28. The diameter of the cylindrical outer surface is preferably somewhat larger than the desired finished diameter of the piston. The shape and size of the raised band 28 are held to precise limits which are initially determined by experimentation and which, when once determined, may be readily duplicated by the use of a formed tool for turning the same.

The head end of the piston is provided with a cylindrical extension 30 having a conical center seat 32 for a purpose later to be described. The piston 18 is provided with a central lubricating bore 34 which communicates with a central bore, not shown, running the full length of the connecting rod 10. The piston is made of a ductile metal, it being preferred to use a beryllium-copper alloy which may be hardened by heat treatment. The piston and connecting rod are assembled with the ball 12 engaging the hemispherical seat 22. A split sleeve 36 is assembled to the connecting rod adjacent the piston end and is provided with a cylindrical shoulder 38 fitting the bore 20 having a conical portion 40 extending to the ball 12. A second split sleeve 42 is assembled to the connecting rod 10 adjacent the ball end 14. The sleeves 36 and 42 are provided with reduced cylindrical portions 44 and 46 at their adjacent ends, in which is mounted and retained by friction a split sleeve 48 which is assembled with its plane of split out of register with those of the sleeves 36 and 42 (see Fig. 4).

The assembly comprising connecting rod 10, piston 18, sleeves 36, 42 and 48 is inserted endwise in a drawing die block 50 which is provided with a tapered bore 52 leading to a cylindrical bore 54, beyond which is an enlarged clearance bore 56. Extending into the bore 56 is a spring-loaded bell crank 58 pivoted at 60. A spring 62 and a ball 64 coact with a cam surface 66 on the bell crank 58 to urge the latter clockwise in Fig. 1 and thus hold the ball 12 snugly against the seat 22. A recess 68 is provided adjacent the cam surface 66 whereby the ball 64 may retain the bell crank 58 in the position illustrated in Fig. 2.

The drawing die block 50 carries removably secured thereto a guide cap 70 for guiding the piston 18 at the beginning of the drawing operation. A punch member 72 has a bore 74 for receiving the projection 30 and at its right-hand end abuts the head of the piston 18. The punch 72 and die block 50 may be assembled into any suitable press device whereby the punch 72 may be forced to the right in Fig. 1 to force the piston 18 and assembled parts through the tapered bore 52 and the cylindrical bore 54 of the die block 50.

Figure 2:
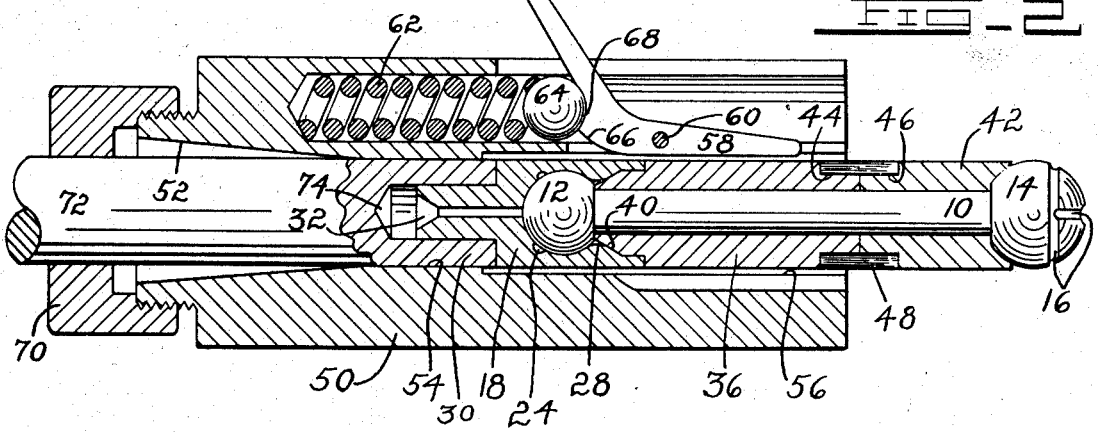
Fig. 2 is a view corresponding to Fig. 1 after the completion of the drawing operation.

The position and shape of the parts after such a drawing operation are illustrated in Fig. 2, from which it will be seen that the raised band 28 is forced radially inward to form a socket embracing the ball 12 over more than a hemisphere. The cylindrical shoulder 38 on the sleeve 36 and the conical portion 40 serve to assist in localizing the deformation of the raised band 28 to insure accurate formation of the socket.

Figure 3:
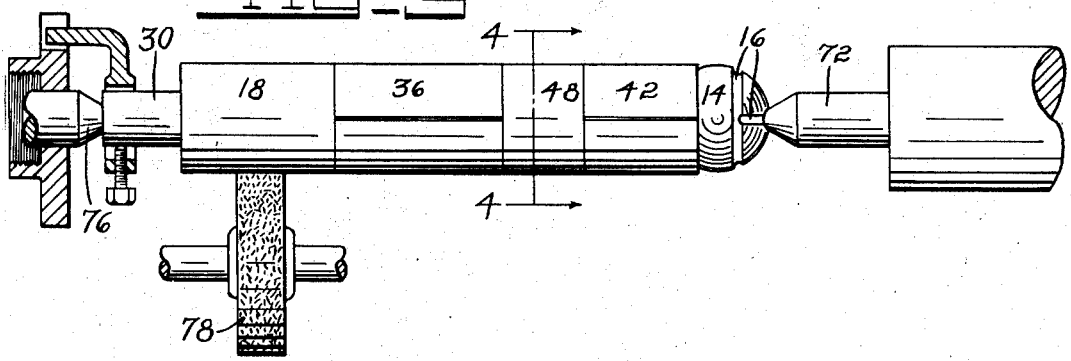
Fig. 3 is a view showing a method of sizing the cylindrical outer surface of a piston.
Figure 4:
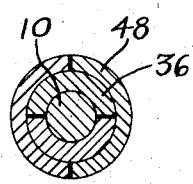
Fig. 4 is a cross section on line 4—4 of Fig. 3.

At the completion of the drawing operation illustrated in Fig. 2, the assembly, including the sleeves 36, 42 and 48 is placed in a grinding machine, as illustrated in Fig. 3, with centers 76 engaging the center seat 32 and a similar seat, not shown in the ball 14. The outer surface of the piston 18 is ground down to the precise finished diameter required by a grinding wheel 78. If desired, the grinding may be performed in a centerless grinding machine in which case the extension 30 may be omitted from the piston 18 when first formed.

After the grinding operation the assembly may be chucked in a lathe and the extension 30 cut off by a cut-off tool 80 as illustrated in Fig. 5. The piston may then be heat treated to increase its hardness. The connecting rod 10 with the finished piston 18 assembled thereon is next detached from the sleeves 36, 42 and 48, and assembled to a socket member 82 having a cylindrical bore 84 terminating in a hemispherical seat 86. The assembly is inserted in a die block 87 having a bore 88 receiving the piston 18 and having a partially spherical socket 90 at the right-hand end of the bore 88. A spring 92 urges the piston 18 to the right and maintains the ball 14 in contact with the seat 86. The die block 87 may be assembled in a hydraulic press which is indicated diagrammatically as having a movable platen 94 operated by a hydraulic piston 96. The piston 96 operates in a cylinder 98 to which fluid is supplied by a reversible, variable delivery pump 100. The pressure which can be exerted by the platen 94 is limited by an adjustable pressure relief valve 102 connected across the pump 100, a manual by-pass valve 104 being also provided for controlling the operation of the press.

With the parts assembled as illustrated in Fig. 6, the by-pass valve 104 may be closed and the pump controlled to deliver fluid into the right-hand end of the cylinder 98. The socket member 82 is thus forced into the spherical socket 90, deforming the cylindrical bore 84 radially inward to form an integral socket embracing the ball 14 over more than a hemisphere, as illustrated in Fig. 7. The use of a hydraulic press with controlled maximum pressure enables the clearance between the ball 14 and the finished socket to be precisely controlled independently of variations in the axial distance between the center of the hemispherical seat 86 and the end face of the socket member 82. The press platen is opened and the completed assembly may be removed from the die block 87 with a finished appearance as illustrated in Fig. 8.

In the modified form of the invention illustrated in Figs. 9, 10 and 11, a piston 106 is formed similarly to the piston 18 except that the extension 30 is omitted. The connecting rod 10 is assembled to the piston 106 and to a socket 108 which is formed with a raised annular band 110 similar to the raised band 28 on the piston 18. Split sleeves 112 and 116 are assembled to the connecting rod 10 and retained in position frictionally by a third split sleeve 118. This assembly is then positioned on a stationary abutment 120 and a manually adjustable abutment 122 which may be moved toward and away from the abutment 120 by a screw 124 and a hand wheel 126. The abutments 120 and 122 are preferably provided with conical centers 128 and 130 receivable in corresponding depressions in the piston 106 and the socket member 108 respectively. A pair of movable drawing dies 132 and 134 surround the abutments 120 and 122 respectively and are provided with conical bores 136 and 138 terminating in cylindrical bores 140 and 142, respectively.

The die blocks 132 and 134 are then moved toward each other into the position illustrated in Fig. 10, thus forcing the raised bands 110 and 28 radially inward to form sockets embracing the balls 12 and 14 in a manner similar to that illustrated in Figs. 1 and 2. The diameter of the cylindrical outer portion of the piston 106 before drawing is slightly greater than the desired finished diameter of the piston 106, the finishing being done, however, by the drawing operation rather than by an additional grinding operation. Thus the material on either side of the raised band 28 is compacted radially inward to the diameter of the cylindrical portion 142, providing a precisely controlled and uniform piston diameter as well as providing a smooth exterior finish. The completed sub-assembly after removal of the split sleeves 112, 116 and 118 is illustrated in Fig. 11.

While the form of embodiment of the invention as herein disclosed, constitutes a preferred form, it is to be understood that other forms might be adopted, all coming within the scope of the claims which follow.

What is claimed is as follows:

1. The method of forming a piston and connecting rod assembly which comprises forming a connecting rod with a ball end, forming a piston with a cylindrical bore terminating in a concave hemispherical surface to match the ball end of the connecting rod and with a cylindrical outer surface interrupted by a raised band axially spaced from the open end of the bore, deforming said raised band radially inward while maintaining the ball end in contact with said hemispherical surface and while supporting the outer portion of said cylindrical bore against deformation to form a socket embracing the ball end over more than a hemisphere, and reducing the outer surface of the piston to a predetermined diameter.

2. The method of forming a piston and connecting rod assembly which comprises forming a connecting rod with a ball end, forming a piston with a cylindrical bore terminating in a concave hemispherical surface to match the ball end of the connecting rod and with a generally cylindrical outer surface, deforming a portion of the piston wall surrounding said cylindrical bore radially inward while maintaining the ball end in contact with said hemispherical surface and while supporting at a substantial radial distance from the connecting rod the outer portion of said cylindrical bore against deformation to form a socket embracing the ball end over more than a hemisphere, and reducing the outer surface of the piston to a predetermined diameter.

3. The method of forming a piston and connecting rod assembly which comprises forming a connecting rod with a ball end, forming a piston with a cylindrical bore terminating in a concave hemispherical surface to match the ball end of the connecting rod and with a cylindrical outer surface interrupted by a raised band axially spaced from the open end of the bore, deforming said raised band radially inward while maintaining the ball end in contact with said hemispherical surface and while supporting the outer portion of said cylindrical bore against deformation to form a socket embracing the ball end over more than a hemisphere, and simultaneously drawing down the outer surface of the piston to a predetermined diameter.

4. The method of forming a piston, connecting rod and ball joint assembly which comprises forming a connecting rod with ball ends, forming a piston with a cylindrical bore terminating in a concave hemispherical surface to match a ball end of the connecting rod and with a cylindrical outer surface interrupted by a raised band, forming a socket member with a cylindrical bore terminating in a concave hemispherical surface to match the other ball end and with a cylindrical outer surface interrupted by a raised band, concomitantly deforming said raised bands, radially inward while maintaining the ball ends in contact with their respective hemispherical surfaces to form sockets embracing the ball ends over more than a hemisphere, and simultaneously drawing down the outer surface of the piston to a predetermined diameter.

5. The method of forming a ball and socket joint having a one-piece socket which comprises forming a socket member with a cylindrical bore terminating in a concave hemispherical surface and with a cylindrical outer surface having a raised band axially spaced from the open end of the bore, and deforming the raised band radially inward while maintaining a ball in contact with the hemispherical surface and while supporting the outer portion of said cylindrical bore against deformation to form a socket embracing the ball over more than a hemisphere.

6. The method of forming a ball and socket joint having a one-piece socket which comprises forming a socket member with a cylindrical bore terminating in a concave hemispherical surface and with a cylindrical outer surface having a raised band axially spaced from the open end of the bore, and deforming the raised band radially inward by a drawing operation while maintaining a ball in contact with the hemispherical surface and while supporting the outer portion of said cylindrical bore against deformation to form a socket embracing the ball over more than a hemisphere.

EDWIN L. ROSE.